United States Patent
Robbins et al.

(10) Patent No.: US 10,362,131 B1
(45) Date of Patent: Jul. 23, 2019

(54) FAULT TOLERANT MESSAGE DELIVERY

(71) Applicant: Amazon Technologies, Inc., Seattle, WA (US)

(72) Inventors: Alan Stuart Robbins, Mercer Island, WA (US); Maxim E. Fateev, Seattle, WA (US); Marvin M. Theimer, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/017,409

(22) Filed: Feb. 5, 2016

Related U.S. Application Data

(63) Continuation of application No. 12/176,255, filed on Jul. 18, 2008.

(60) Provisional application No. 61/073,741, filed on Jun. 18, 2008.

(51) Int. Cl.
| | |
|---|---|
| *G06F 11/07* | (2006.01) |
| *G06F 11/14* | (2006.01) |
| *H04L 12/58* | (2006.01) |
| *H04L 29/08* | (2006.01) |

(52) U.S. Cl.
CPC ...... *H04L 67/2809* (2013.01); *G06F 11/0793* (2013.01); *G06F 11/1451* (2013.01); *G06F 11/1469* (2013.01); *H04L 51/04* (2013.01); *H04L 67/32* (2013.01)

(58) Field of Classification Search
CPC ............ G06F 11/1451; G06F 11/1469; G06F 11/0793; G06F 11/2097
See application file for complete search history.

(56) References Cited

U.S. PATENT DOCUMENTS

| | | | |
|---|---|---|---|
| 5,493,569 A | 2/1996 | Buchholz et al. | |
| 5,557,798 A | 9/1996 | Skeen et al. | |
| 5,916,307 A | 6/1999 | Piskiel et al. | |
| 5,961,606 A | 10/1999 | Talluri et al. | |
| 6,185,613 B1 * | 2/2001 | Lawson | G06F 9/542 709/224 |
| 6,310,888 B1 | 10/2001 | Hamlin | |
| 6,529,932 B1 | 3/2003 | Dadiomov et al. | |
| 6,615,383 B1 | 9/2003 | Talluri et al. | |
| 6,738,815 B1 | 5/2004 | Willis, Jr. et al. | |
| 6,769,027 B1 | 7/2004 | Gebhardt et al. | |
| 7,139,859 B2 | 11/2006 | Dastidar et al. | |
| 7,213,049 B2 | 5/2007 | Felt et al. | |
| 7,336,675 B2 | 2/2008 | Naik et al. | |
| 7,818,757 B1 | 10/2010 | Tsimelzon et al. | |
| 8,156,177 B2 | 4/2012 | Bein | |

(Continued)

*Primary Examiner* — Jigar P Patel
(74) *Attorney, Agent, or Firm* — Knobbe, Martens, Olson & Bear, LLP

(57) ABSTRACT

A plurality of redundant brokers may be used as intermediaries to exchange messages between one or more producers and one or more consumers. More specifically, one or more producers may enqueue messages to a primary broker. The primary broker then dispatches the received messages to one or more interested consumers. However, should the primary broker fail, messages enqueued by the producers may be lost, and thus delivery of such messages may fail. Accordingly, one or more backup brokers may be provided that can assume the responsibilities of the failed primary broker and dispatch copies of the messages that were enqueued by the producers to the failed primary broker.

20 Claims, 14 Drawing Sheets

(56) References Cited

U.S. PATENT DOCUMENTS

| | | |
|---|---|---|
| 2002/0161834 A1* | 10/2002 | Rescorla .................. H04L 29/06 |
| | | 709/203 |
| 2002/0172164 A1 | 11/2002 | Chou et al. |
| 2003/0126029 A1 | 7/2003 | Dastidar et al. |
| 2003/0182464 A1 | 9/2003 | Hamilton et al. |
| 2003/0225835 A1 | 12/2003 | Klien et al. |
| 2004/0205770 A1 | 10/2004 | Zhang et al. |
| 2005/0068896 A1 | 3/2005 | Pazos |
| 2005/0125557 A1* | 6/2005 | Vasudevan .......... G06F 11/2038 |
| | | 709/239 |
| 2005/0268145 A1 | 12/2005 | Hufferd et al. |
| 2006/0020635 A1* | 1/2006 | Green .................. G06F 11/2097 |
| 2006/0034248 A1 | 2/2006 | Mishra et al. |
| 2006/0075133 A1 | 4/2006 | Kakivaya et al. |
| 2006/0179147 A1* | 8/2006 | Tran .................... G06F 11/2012 |
| | | 709/227 |
| 2006/0200829 A1 | 9/2006 | Asti et al. |
| 2006/0218238 A1 | 9/2006 | Critchley et al. |
| 2007/0064737 A1 | 3/2007 | Williams |
| 2007/0130353 A1 | 6/2007 | Chou et al. |
| 2007/0156834 A1 | 7/2007 | Nikolov |
| 2007/0174411 A1 | 7/2007 | Brokenshire et al. |
| 2007/0198437 A1 | 8/2007 | Eisner et al. |
| 2007/0204195 A1 | 8/2007 | Fuhs et al. |
| 2007/0288466 A1 | 12/2007 | Bohannon et al. |
| 2008/0069141 A1 | 3/2008 | Bonaguro et al. |
| 2008/0072114 A1 | 3/2008 | Fuhs et al. |
| 2008/0162817 A1* | 7/2008 | Batterywala .......... G06F 3/0611 |
| | | 711/118 |
| 2009/0007141 A1 | 1/2009 | Blocksome et al. |
| 2009/0133039 A1 | 5/2009 | Chkodrov et al. |

* cited by examiner

FAULT TOLERANT MESSAGE DELIVERY

CROSS-REFERENCE TO RELATED APPLICATION

This application is a continuation of U.S. patent application Ser. No. 12/176,255, filed Jul. 18, 2008, which claims the benefit of U.S. Provisional Application No. 61/073,741, filed Jun. 18, 2008, each of which are incorporated herein by reference in their entireties.

BACKGROUND

Integrated processing architectures in which a variety of computing devices and/or applications communicate with each other over a communication network are widely used in e-commerce and enterprise environments. Given the variety and number of computing devices/applications in such architectures, a large volume of messages is communicated between such devices/applications. Accordingly, message brokers are often used to act as an intermediary device or application. The broker facilitates delivery of a message from a source device or application (referred to herein as a "producer") to a destination device or application (referred to herein as a "consumer"). Brokers require a large amount of resources to store and deliver such messages between producers and consumers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As will be described herein, a computing device or application referred to as a "broker" may be used as an intermediary to exchange messages between one or more producers and one or more consumers. Multiple, redundant brokers may be provided in order to ensure the availability of messages for delivery to interested consumers in the face of failures. Accordingly, consumers and producers are not limited to communicating with only one broker. Rather, one or more consumers and/or one or more producers may communicate with multiple brokers.

Figure 1A:
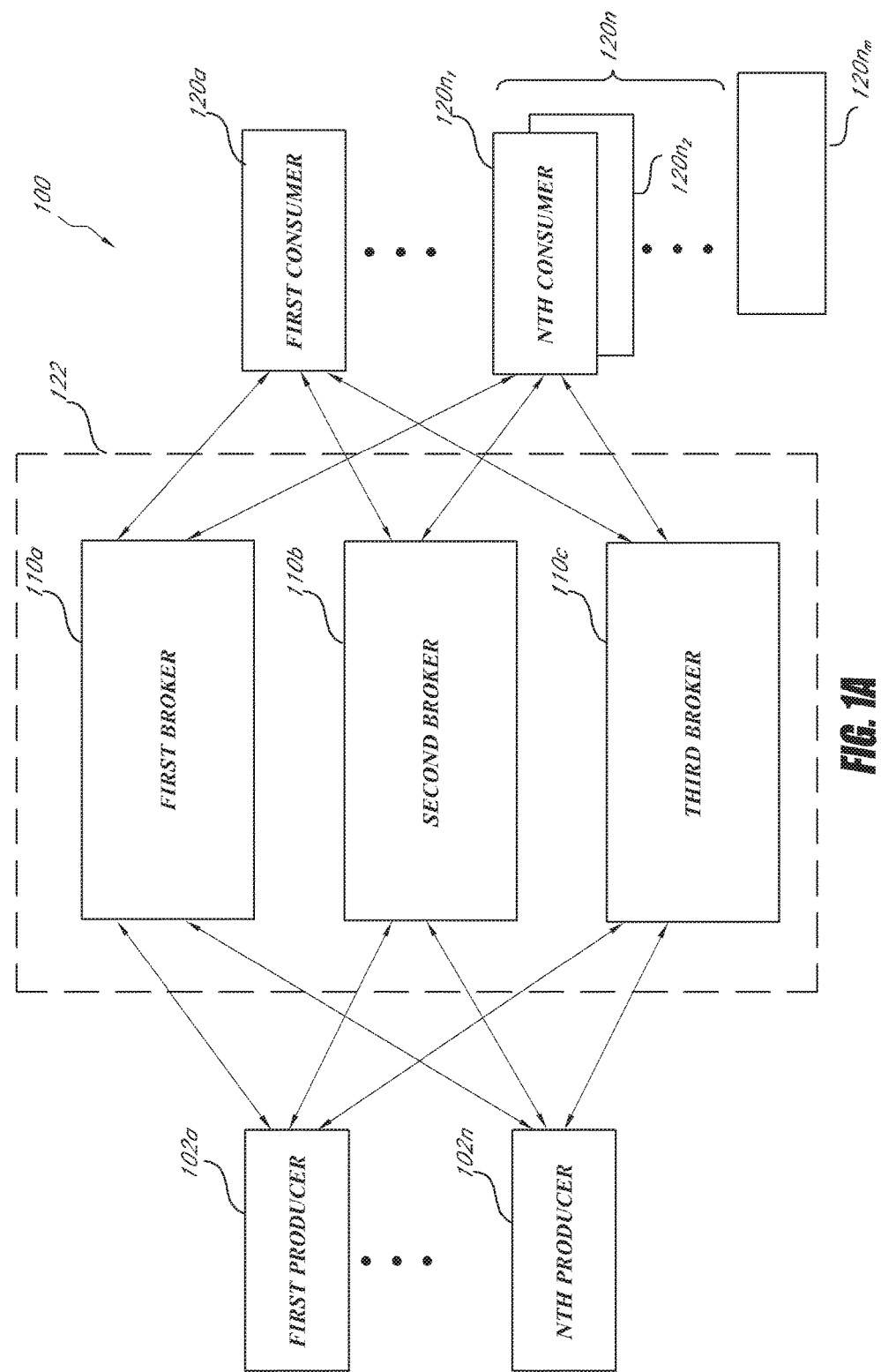
FIGS. 1A and 1B are block diagrams of an illustrative system in which messages are exchanged between producers and consumers via a plurality of brokers.

An illustrative system 100 is shown in FIG. 1A in which a plurality of brokers 110a-110c (also referred to as a "cluster 122") may be used as intermediaries to exchange messages between one or more producers 102a-102n and one or more consumers 120a-120n. More specifically, one or more producers 102a-102n may enqueue messages to one of the brokers (e.g., broker 110a) in the cluster 122. Broker 110a then dispatches the received messages to one or more interested consumers 120a-120n, who can dequeue messages from any of the brokers 110a-110c in the cluster 122. However, should broker 110a fail (e.g., the broker ceases communications, a data center in which the broker is located is compromised, etc.), messages enqueued by producers 102a-102n may be lost, and thus, delivery of such messages may fail. Accordingly, in the event of primary broker failure, one or more backup brokers (e.g., brokers 110b and 110c) are provided that can dispatch copies of the messages that were enqueued by the producers 102a-102n to the failed broker 110a.

By utilizing one or more backup brokers to dispatch copies of the messages, the producer of each message is assured that at least one copy of the message will be delivered, provided the entire cluster 122 does not fail. More specifically, by having an n number of brokers store a copy of the message, an n−1 number of failed brokers can be tolerated, because there will be at least one backup broker available to dispatch the message. Accordingly, message delivery assurance and system durability can be maintained under threat of broker failure by adding backup brokers. The number of redundant backup brokers for any message can be determined based upon the expected rate of broker failure and the backlog of messages. Accordingly, if the expected rate of broker failure and/or the backlog of messages increases, backup brokers can be added in support of a primary broker. In addition, brokers can also be added to the cluster 122 as the volume of messages increases. In other words, the cluster 122 can be scaled linearly by adding more brokers to maintain scalability and availability. In some instances, there can be more brokers in a cluster than there are primary and backup brokers.

A message may include any relevant information transmitted electronically from a producer to an interested consumer via a broker in cluster 122. A message can contain one or more blocks of data, as well as control information, a header (including, e.g., length, format, destination address, type, identifier, etc.), and error-checking information. Producers 102a-102n may be any computing device or application (referred to herein collectively and interchangeably as a "computing device") capable of generating a message, while consumers 120a-120n may be any computing device capable of consuming a message. It will also be appreciated that in some embodiments, a producer may also act as a consumer and vice versa.

Figure 1B:
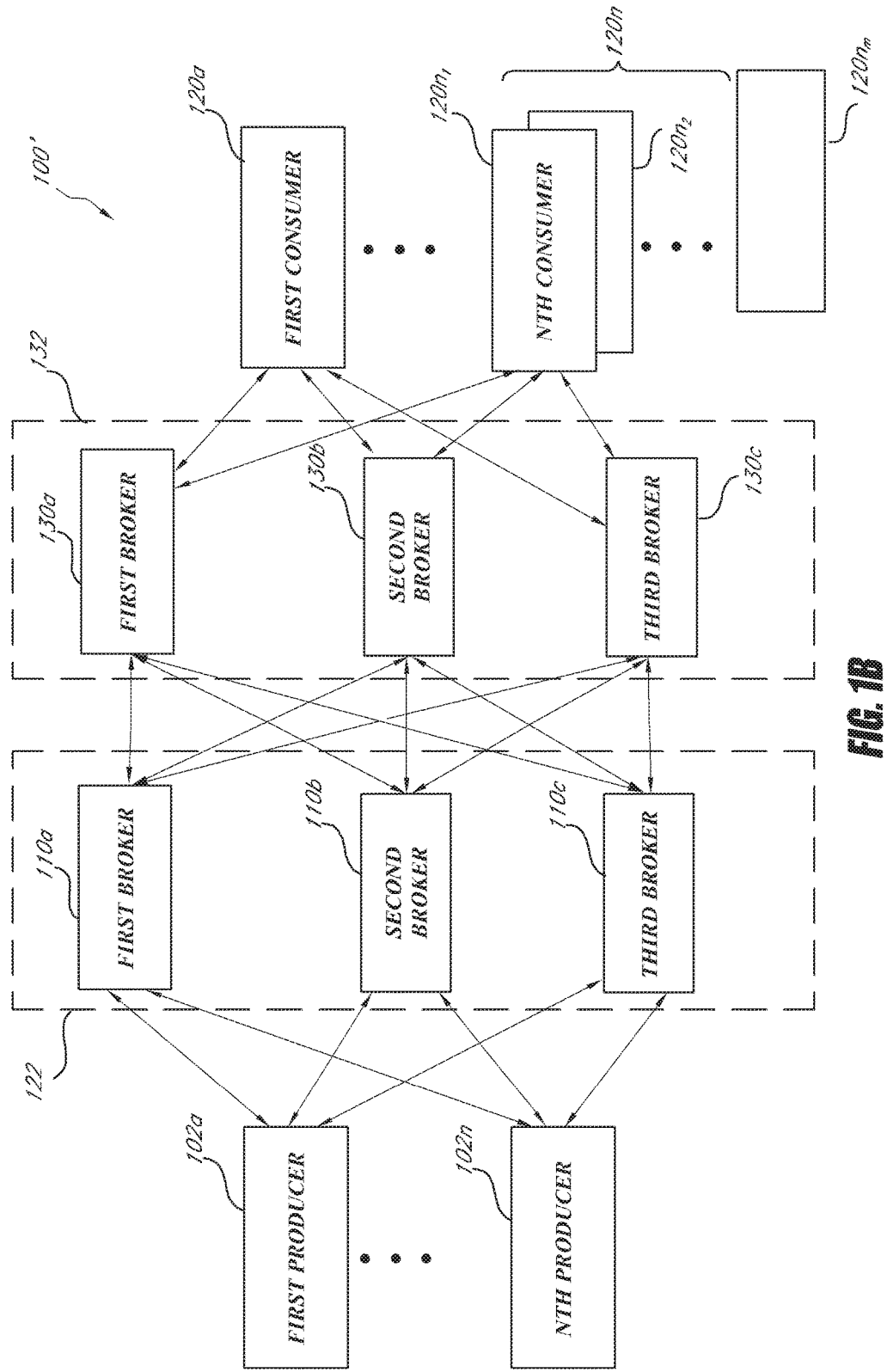

Brokers 110a-c may be any computing device capable of receiving messages, accessing messages stored in memory, and dispatching messages. A broker, such as broker 110*a* can be co-located with a producer on the same computing device, co-located with a consumer on the same computing device, or be a standalone computing device. Although only a single cluster 122 of brokers 110*a*-110*c* is depicted in FIG. 1A, multiple broker clusters also referred to as a "network" of brokers may be utilized to communicate messages between producers and consumers as shown in FIG. 1B. In such cases, producers 102*a*-102*n* may be assigned its own cluster of brokers, e.g., cluster 122, and consumers 120*a*-120*n* may be assigned its own cluster of brokers, e.g., cluster 132. A broker in the downstream cluster is considered a "consumer" for purposes of routing the message from cluster to cluster. Brokers may be grouped together logically to form a cluster, or physically, e.g., within the same data center. In other embodiments, clusters of brokers may be remote from each other, and thus, communicate via a network, such as a wide area network or an internetwork.

In one embodiment, each broker registers with a cluster upon startup and is assigned a unique broker identifier, which identifier can be used by others to discover the broker. In some embodiments, domain name system ("DNS") discovery tools are used to discover brokers by unique identifier. Such DNS discovery tools may be used by a producer to identify a primary broker and/or may be used by a primary broker to identify one or more backup brokers. In some embodiments, if a broker fails or "dies" or is declared dead, no attempt is made to recover the broker. In this case, if the broker is restarted a new unique identifier may be assigned so that the broker again becomes discoverable within a cluster as a new broker.

Producers and consumers may generate and process messages for any purpose. In some embodiments, a producer or consumer may operate to provide a particular service or functionality. For example, first producer 102*a* may be a software application implemented by a server for placing an order for an item such as a digital camera and consumer 120*a* may be a software application implemented by a server for fulfilling the order. Accordingly, first producer 102*a* may generate a message to be provided to consumer 120*a* requesting fulfillment and providing fulfillment information such as identification of the item ordered, shipping information, etc. In yet other embodiments, a service and/or functionality, such as the fulfillment service referred to above, may result from the operation of multiple computing devices. In such embodiments, the service may be considered a consumer, and each computing device may be considered an instance of that consumer. This is illustratively depicted in FIGS. 1A and 1B, in which the $n^{th}$ consumer 120*n* is a service provided by a plurality of devices, and each device is depicted as an $n^{th}$ consumer instance $120n_1$-$120n_m$. Accordingly, as a producer, e.g., producer 102*a*, sends messages to a broker, e.g., broker 110*a*, in which consumer 120*n* is interested, the broker will dispatch the messages from a physical queue to one of the instances $120n_1$-$120n_m$ of the consumer 120*n*. However, for purposes of the following discussion, reference will be made simply to a "consumer" rather than "consumer instance(s)." Accordingly, those skilled in the art will appreciate that in the following description references to a "consumer" may include a consumer group of one or more instances or a specific consumer instance. Moreover, brokers may forward messages to other brokers, e.g., in a chain, to effect routing, stream splitting or other needs. Accordingly, a downstream broker or cluster of brokers may be considered a consumer.

Figure 2:
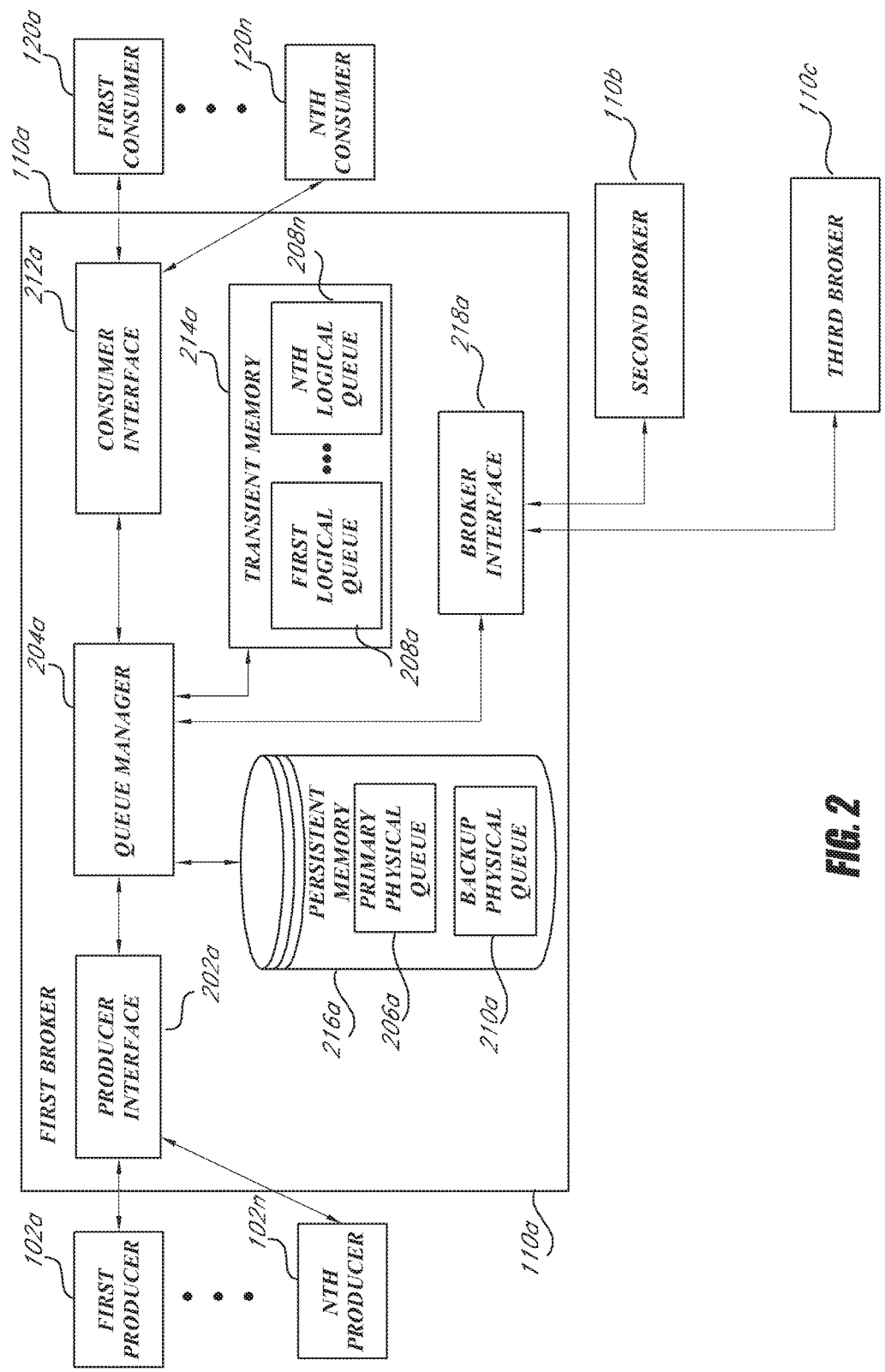
FIG. 2 is a block diagram of representative functional components of a first broker shown in FIG. 1.

FIG. 2 is a block diagram of representative functional components of the broker 110*a* shown in FIG. 1A. Those skilled in the art will appreciate that the same or similar components may be found in the other brokers 110*b*-110*c*. As illustrated, broker 110*a* may include, among other things, a producer interface 202*a*, a queue manager 204*a*, a consumer interface 212*a* and a broker interface 218*a*. Producer interface 202*a* may be a software application and/or hardware device that communicatively couples broker 110*a* to producers 102*a*-102*n* via a wired and/or wireless communications network, such as a local area network, a wide area network, an intranetwork, an internetwork, the Internet, etc. Producer interface 202*a* is configured to receive messages from producers 102*a*-102*n* and provide the messages (or translated messages) to queue manager 204*a*. In some embodiments, producer interface 202*a* also encrypts and decrypts incoming and outgoing messages.

Similarly, consumer interface 212*a* may be a software application and/or hardware device that communicatively couples broker 110*a* to consumers 120*a*-120*n* via a wired and/or wireless communications network. The consumer interface 212*a* is configured to receive messages from the queue manager 204*a*, translate the messages if needed, and dispatch the messages to interested consumers 120*a*-120*n*. In some embodiments, consumer interface 212*a* also encrypts and decrypts incoming and outgoing messages. Although illustrated in FIG. 2 as separate interfaces, producer interface 202*a* and consumer interface 212*a* may be the same interface. In yet other embodiments, the producer interface 202*a* and the consumer interface 212*a* may communicate with other computing devices/components via the same communication connection or via separate communication connections.

Broker interface 218*a* may be a software application and/or hardware device that communicatively couples broker 110*a* to brokers 110*b*-110*c* via a wired and/or wireless communications network, such as a local area network, a wide area network, an intranetwork, an internetwork, the Internet, etc. Broker interface 218*a* is configured to send and receive messages and other communications to and from brokers 110*b*-110*c*.

In one embodiment, queue manager 204*a* is a software application and/or hardware device that manages incoming messages from the producers 102*a*-102*n* and outgoing messages to interested consumers 120*a*-120*n*. More specifically, in the case where broker 110*a* is acting as a primary broker, queue manager 204*a* may utilize a primary physical queue 206*a* to store all messages received from producers 102*a*-102*n*. In one embodiment, the physical queue is a multi-element, linear data structure stored in a persistent memory 216*a* (e.g., flash memory, disk, etc.) of the broker 110*a*. Those skilled in the art will recognize that persistent memory may also be referred to as non-volatile memory. While primary physical queue 206*a* is depicted in FIG. 2 as stored in persistent memory 216*a* located within broker 110*a*, those skilled in the art will also recognize that physical queue 206*a* is not limited to this configuration and can be located local or remote to broker 110*a*.

Each message may be stored in the primary physical queue 206*a* along with an acknowledgment identifier (an "ACK ID") that is assigned to the message in a monotonically increasing order. The ACK ID indicates a location of a message in the primary physical queue. In some embodiments in the ACK ID indicates a physical location, while in others embodiments, the ACK ID indicates a logical location. In yet other embodiments, the ACK ID is stored separately from the physical queue. Messages are ultimately deleted from the primary physical queue 206*a* after the broker 110*a* receives acknowledgement messages ("ACKs")

from all consumers indicating that the consumers have received and processed the messages from the physical queue without error.

Each broker in a cluster may be a primary broker for one or more producers, as well as a backup broker for one or more other brokers. Accordingly, broker 110a may also maintain one or more backup physical queues 210a in persistent memory 216a. In one embodiment, a primary broker has two backup brokers, which may be referred to as a "secondary" backup broker and a "tertiary" backup broker. In such an embodiment, each broker in the cluster 122 may serve all three roles, i.e., primary broker, secondary broker and tertiary broker. Accordingly, each broker may maintain a primary physical queue, a secondary physical backup queue, and a tertiary physical backup queue in persistent memory. Each such backup physical queue stores copies of messages received from another (primary) broker for which the current broker is serving as a backup. As a result, should the primary broker fail, the secondary broker will be able to deliver messages stored in its backup physical queue for the primary broker. Moreover, should the primary broker and the secondary broker fail, the tertiary broker will be able to deliver messages stored in its backup physical queue for the primary broker.

Returning to FIG. 2, the queue manager 204a may further utilize one or more logical queues, e.g., logical queues 208a-208n, to track the status of the messages stored in the primary physical queue 206a in persistent memory 216a. In yet other embodiments, the queue manager 204a may further utilize one or more logical queues (not shown) to track the status of the messages stored in each backup physical queue, e.g., backup physical queue 210a.

Each logical queue 208a-208n is a logical view of the primary physical queue 206a and need not contain messages itself. In one embodiment, each logical queue contains a set of pointers to positions within the primary physical queue 206a, which pointers are used to keep track of the messages in the primary physical queue 206a that are in flight to a particular consumer. In contrast to the primary physical queue 206a, logical queues 208a-208n are stored in transient (a.k.a. volatile) memory 214a (e.g., RAM) of the broker 110a (although in some embodiments, one or more logical queues could be stored in persistent memory or some combination of persistent and transient memory). Accordingly, incoming messages are stored (in sequential order) only in persistent memory 216a in the primary physical queue 206a, thus reducing storage space overhead in persistent memory, eliminating the need for multiple write and reducing the read operations per message in persistent memory, and increasing the speed at which messages are enqueued, dispatched and deleted. Accordingly, the primary physical queue 206a operates as a fast sequential message store.

In one embodiment, the queue manager 204a maintains a logical queue for each consumer (or group of consumer instances) 120a-120n. Which messages in the primary physical queue 206a have been acknowledged ("ACKed") as processed by a particular consumer, which are in flight, and which are backlogged (i.e., not yet dispatched) are identified using pointers to certain positions in the primary physical queue 206a, which pointers are managed by the logical queue corresponding to the particular consumer. Accordingly, a logical queue represents a particular consumer's view of the primary physical queue 206a. A pointer may be an address of a location in memory, an index to a location in memory, or some other value denoting a location in persistent memory. A pointer may also be a variable containing any of the foregoing. In one embodiment, each pointer maintained by a logical queue is the ACK ID for a message stored in the physical queue. Additional message status data may also be stored with the pointers in the logical queue and used to manage in flight messages. Such message status data may include whether the message is in flight to the consumer, ACKed by the consumer, or whether the message is backlogged waiting to be provided to the consumer. In some embodiments, the message status data can include additional information such as the last time the message was dispatched to a consumer, and how many times this message has been dispatched to one or more consumers. The queue manager 204a may use the message status data to determine if messages are still in flight and update the pointers accordingly.

Figure 3:
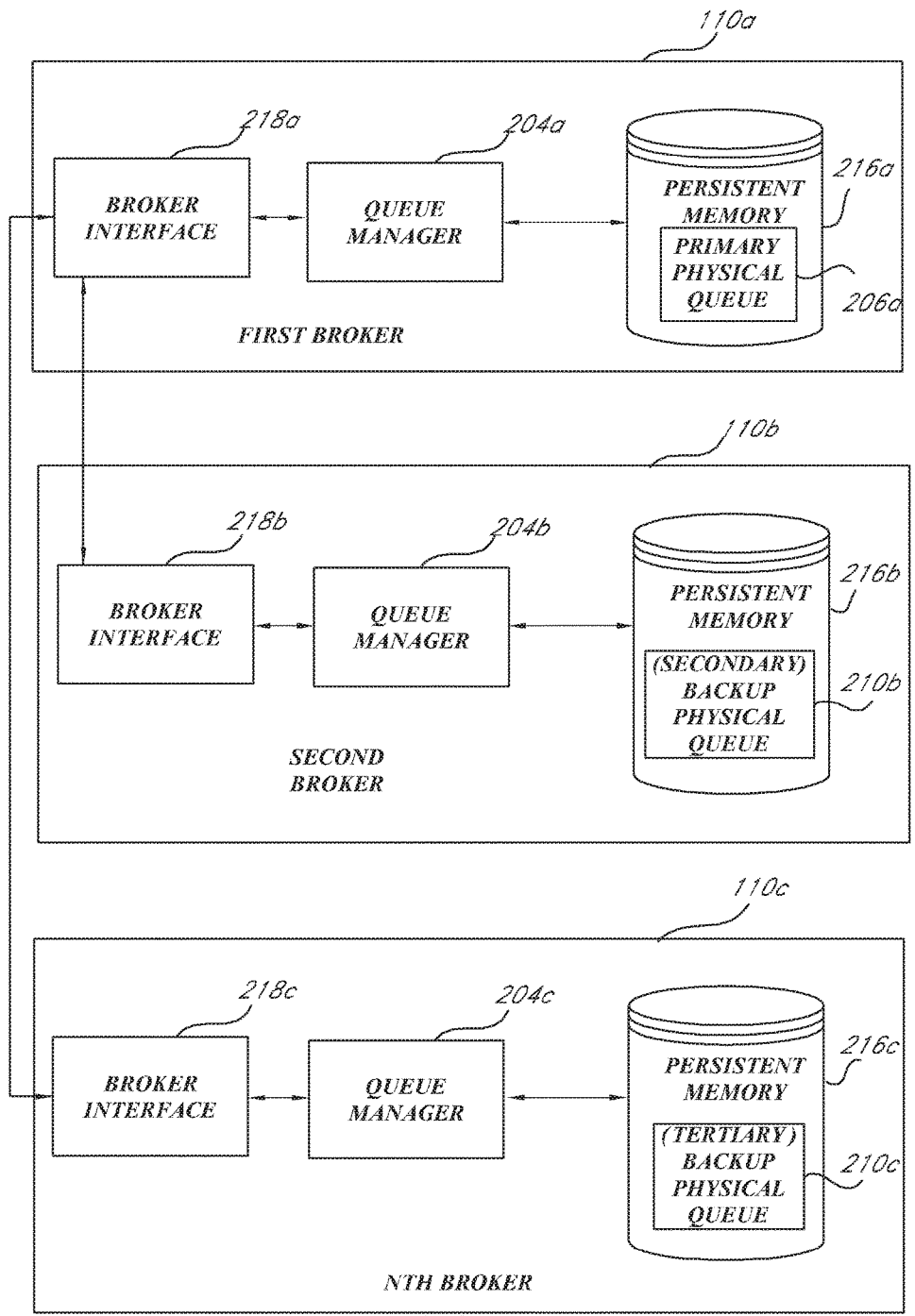
FIG. 3 is a block diagram of first, second and $n^{th}$ brokers shown in FIG. 1, in which the first broker acts as a primary broker, and the second and $n^{th}$ brokers act as backup brokers to the primary broker.

As noted above, each broker 110a-110c can act as both a primary broker and a backup broker. For example, as shown in FIG. 3, first broker 110a may act as a primary broker, while second broker 110b and third broker 110c may act as backup brokers to first or "primary" broker 110a. For purposes of the following discussion, first broker 110a may also be referred to as primary broker 110a. In the illustrated example, one or more producers 102a-102n has selected the first broker 110a to be the primary broker for its next message. In one embodiment, the producer(s) finds the cluster 122 and the primary broker 110a using a DNS discovery tool as described above. The primary broker 110a then selects one or more backup brokers for the received message. In the illustrated example, the primary broker 110 selects two backup brokers, broker 110b and broker 110c. For purposes of the following discussion, broker 110b may also be referred to as a "secondary" broker and broker 110c may also be referred to as a "tertiary" broker. In an embodiment with one primary broker and two backup brokers, two broker failures can be overcome. However, those skilled in the art will appreciate that additional backup brokers, i.e., n backup brokers) may be provided, so that n–1 broker failures can be overcome. The primary broker 110a may also use a DNS discovery tool to find the backup brokers. In one embodiment, the backup brokers may be located at different data centers, even though the backup brokers and the primary broker are in the same cluster.

As will be described in more detail below, upon receipt of a message from a producer, the primary broker 110a provides a copy of the message to each of its backup brokers, e.g., secondary broker 110b and tertiary broker 110c, via its broker interface 202a. The metadata for the message copy includes the unique identifier for the primary broker as well as a unique identifier for each of the backup brokers selected by the primary broker to receive the message copy. Upon receipt of the message copy via its broker interface 218b, the secondary broker 110b recognizes that the message is from a primary broker (rather than another producer) from the unique broker identifier found in the message metadata and enqueues the message copy in its (secondary) backup queue 210b, rather than in its own primary queue. Similarly, the tertiary broker 110c enqueues the message copy in its (tertiary) backup queue 210c. The backup brokers 110b and 110c then send the primary broker 110a confirmation of receipt of the message copy. Upon receipt of confirmation of message copy receipt from the backup brokers, the primary broker 110a then enqueues the message in its primary physical queue 206a. The primary broker 110a then sends the producers confirmation that a backup of the message is in force.

Absent any failures, the primary broker 110a dispatches messages from its primary physical queue 206a to interested consumers. As will be described in more detail below, as messages are ACKed by consumers, the primary broker 110a will delete messages from its primary physical queue 206a and will inform the backup brokers 110b and 110c regarding the messages it has deleted. The backup brokers 110b and 110c will then delete the corresponding copies from their respective backup queues, 210b and 210c. However, if the primary broker 110a fails, secondary broker 110b will activate its secondary backup queue 210b and begin dispatching the message copies from the secondary backup queue 210b to the interested consumers. If both the primary broker 110a and the secondary broker 110b fail, the tertiary broker 110c will activate its tertiary backup queue 210c and begin dispatching the message copies from the tertiary backup queue 210c to the interested consumers. Similarly, if n backup brokers are provided and the primary through n−1 backup brokers fail (i.e., the primary broker and any intervening brokers), the $n^{th}$ backup broker will begin dispatching message copies.

Figure 4:
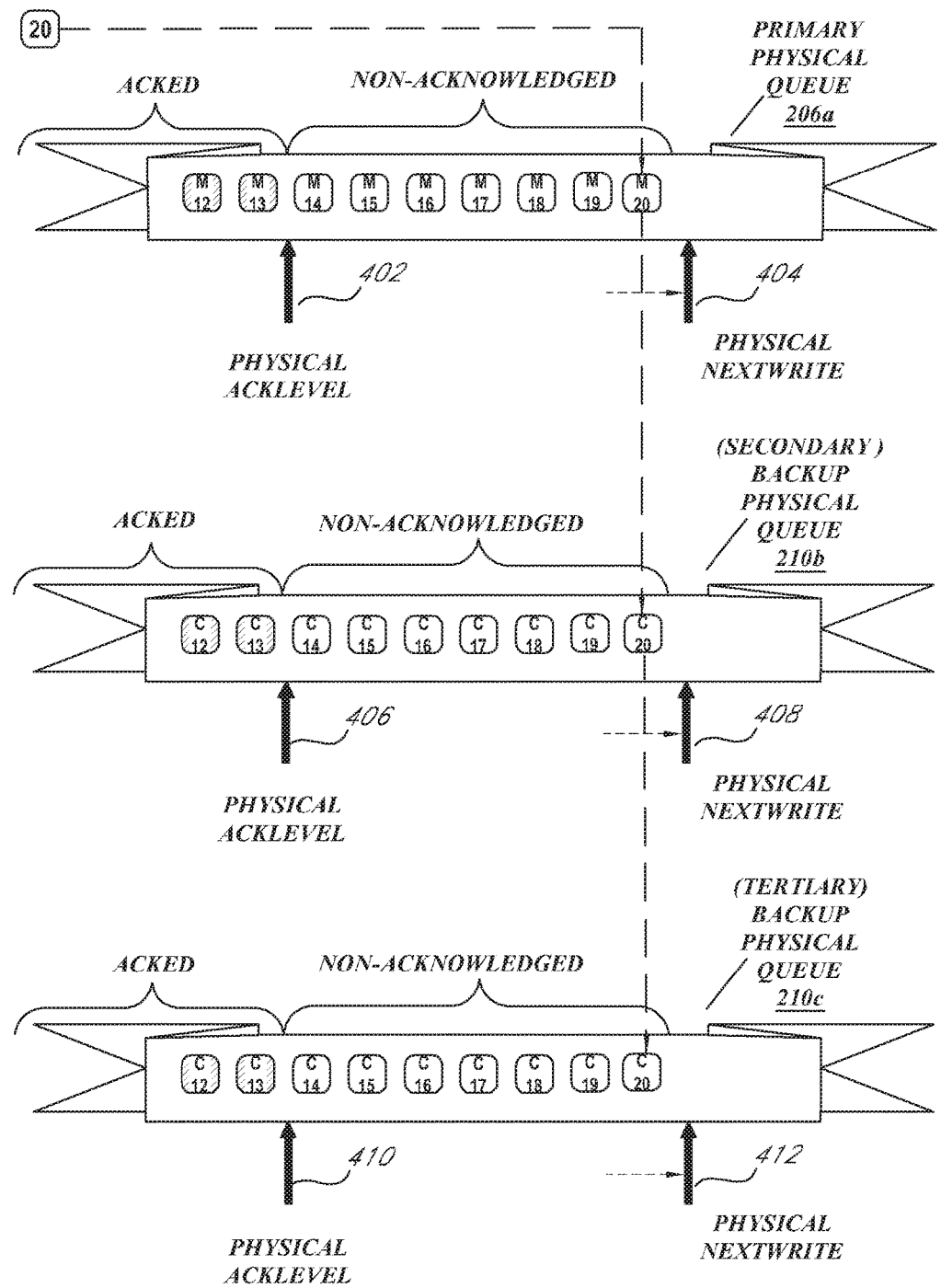
FIGS. 4, 7, and 8 are pictorial diagrams of illustrative physical queues maintained by the primary broker and backup brokers shown in FIG. 3.

FIG. 4 is a pictorial diagram of the primary physical queue 206a, secondary backup queue 210b and tertiary backup queue 210c following receipt of a number of messages from producers 102a-102n. In one embodiment, when a message (e.g., message 20) is received from a producer, such as producer 102a, the message is assigned an ACK ID (which ACK IDs are assigned to messages in monotonically increasing order) and a copy of the message is sent to each backup broker for the primary broker 110a. In the illustrated embodiment, copies of each message are sent to backup broker 110b and 110c. However, in other embodiments, the backup brokers may be selected by the primary broker on a message-by-message basis. Accordingly, different backup brokers may be used by the primary broker for one or more messages.

Once the primary broker 110a receives confirmation of message receipt from each of its backup brokers for the message, the primary broker 110a inserts the message (e.g., message 20) into the primary physical queue 206a at a next available location for writing a message in the queue, e.g., at the tail end of the queue. This position is identified by a physical nextWrite pointer 404. Once written to the end of the primary physical queue 206a (or "enqueued"), the physical nextWrite pointer 404 is advanced to the next available position at the end of the primary physical queue 206a. Accordingly, as messages are received by the primary broker 110a, they are enqueued one after the other to the end of the primary physical queue 206a.

As noted above, prior to enqueuing a message to the primary physical queue 206a, the primary broker 110a provides a copy of the message to each of the backup brokers 110b and 110c. Accordingly, secondary backup broker 110b inserts the message copy (e.g., message copy 20 in the illustrated example) into the secondary physical queue 210b at a next available location for writing a message in the queue, e.g., at the tail end of the queue. This position is identified by a physical nextWrite pointer 408 for the secondary backup physical queue 210b. Once enqueued in the secondary physical queue 210b, the physical nextWrite pointer 408 is advanced to the next available position at the end of the secondary backup physical queue 210b. Message copies are similarly enqueued to the tertiary backup queue 210c maintained by the tertiary backup broker 110c, whose own nextWrite pointer 412 is similarly advanced. Accordingly, as messages are received by the primary broker 110a, copies are enqueued one after the other to the end of the secondary physical backup queue 210b and the tertiary physical backup queue 210c.

Figure 5:
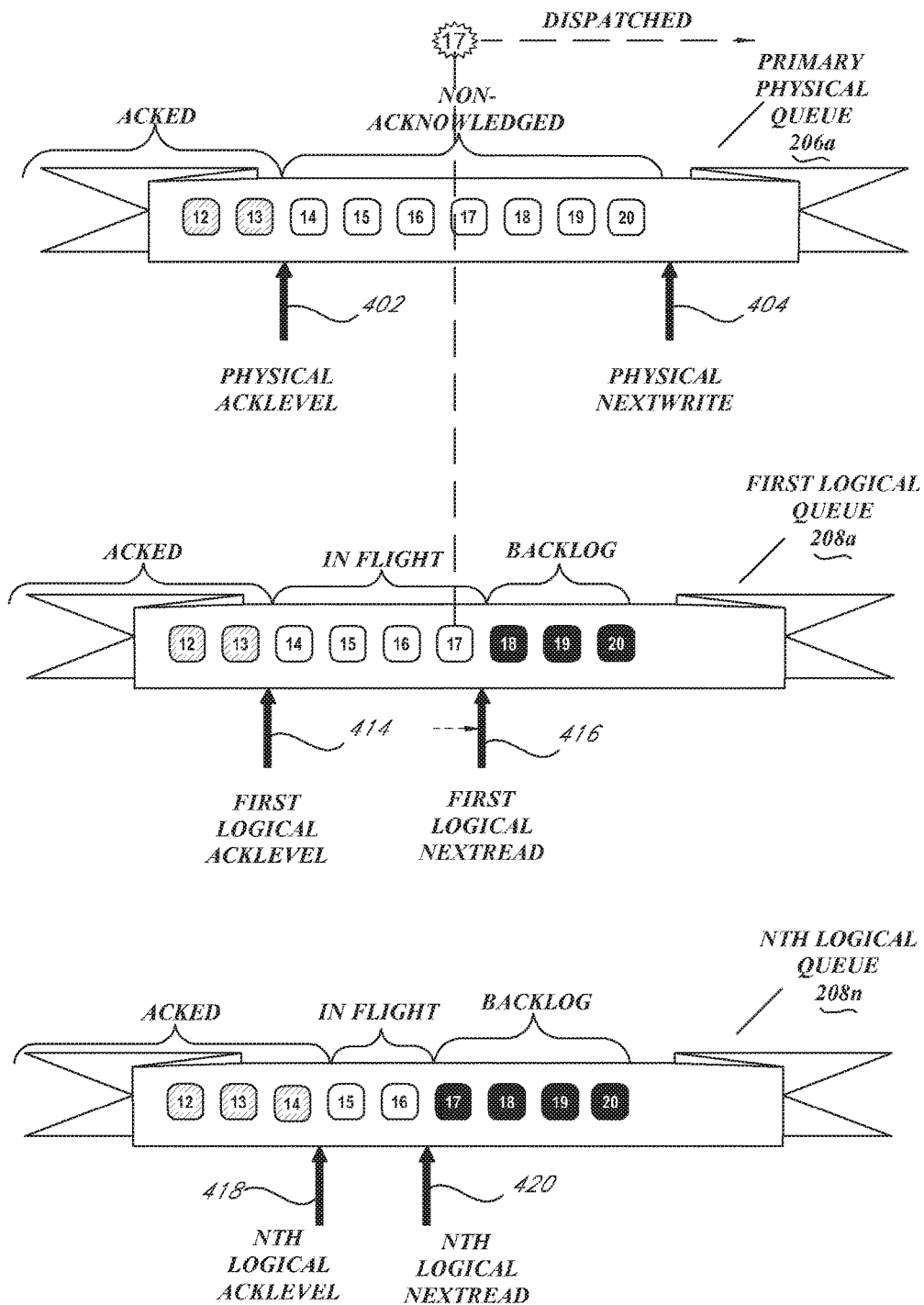
FIGS. 5 and 6 are pictorial diagrams of illustrative physical and logical queues maintained by the primary broker shown in FIG. 3.

FIG. 5 is a pictorial diagram of the primary physical queue 206a and logical queues 208a-208n, all of which are maintained by the primary physical broker 110a. The primary and logical queues are depicted as messages, e.g., message with ACK ID 17, are dispatched to interested consumers. In one embodiment, the status of in flight messages is maintained by one or more logical queues stored in a transient memory accessible to a broker. More specifically, whether a message in a physical queue has been acknowledged as received and processed by a consumer (i.e., "ACKed"), is in flight, or is awaiting dispatch (i.e., "backlogged") is noted using one or more pointers to a position within the physical queue, which pointers are maintained by the logical queues. As will be described in more detail below, these pointers are used to determine which messages may be deleted from the physical queue, and thus, removed from persistent memory. A further description of the use of such pointers and logical queues is set forth in commonly owned, U.S. Provisional Patent Application Ser. No. 61/073,733, entitled "Fast Sequential Message Store," filed concurrently on Jun. 18, 2008, and U.S. patent application Ser. No. 12/176,222, entitled "Fast Sequential Message Store," filed concurrently on Jul. 18, 2008, the entirety of each of which is incorporated herein by reference.

Although the logical queues are depicted as containing the same messages and ACK IDs as in the primary physical queue 206a, such messages and the ACK IDs need not be, in fact, stored in the logical queues. However, as noted above, each logical queue is a logical view of the physical queue for a particular consumer. Therefore, for purposes of illustrating the positioning of the pointers maintained by the logical queues, the logical queues are depicted as having messages with corresponding ACK IDs. The pointers maintained by the logical queues actually reference positions in the primary physical queue 206a.

Referring again to FIG. 5, upon request for a message from a consumer corresponding to a logical queue, such as first consumer 120a, queue manager 204a of the primary broker 110a requests the next message to dispatch from the primary physical queue 206a. For example, the next available, non-dispatched message is requested from the primary physical queue 206a following a first, logical nextRead pointer 416 associated with the logical queue 208a. The logical nextRead pointer specifies the highest ACK ID for a message in the primary physical queue 206a that has not yet been dispatched to the corresponding consumer 120a. After the queue manager 204a requests the message, a copy of the message (i.e., message with ACK ID 17) is dispatched from the primary physical queue 206a to the first consumer 120a and the logical nextRead pointer 416 maintained by the logical queue 208a is advanced from message with ACK ID 17 to the next message (i.e., message with ACK ID 18). All messages following the logical nextRead pointer are considered backlogged for dispatch to the corresponding consumer. In the example illustrated in FIG. 5, messages with ACK IDs 18-20 are backlogged after message with ACK ID 17 is dispatched.

In the example illustrated in FIG. 5, $n^{th}$ consumer 120n, who is also interested in the same messages as first consumer 120a, has not yet requested a message from the primary broker 110a. Accordingly, the $n^{th}$ logical nextRead pointer 420 maintained by the corresponding $n^{th}$ logical queue 208n still specifies the message with ACK ID 17. The $n^{th}$ logical nextRead pointer 420 will not be advanced until the $n^{th}$ consumer 120n corresponding to the $n^{th}$ logical queue requests another message.

Once the nextRead pointer for a logical queue has been advanced, the newly dispatched message is considered in flight to the corresponding consumer until the primary broker 110a receives an ACK from the consumer indicating that it received and processed the message from the primary physical queue 206a without error. In one embodiment, a logical ACKlevel pointer specifies the message in the primary physical queue 206a with the highest ACK ID for which all messages preceding the pointer (and equal to the pointer if the pointer points to the message itself, hereinafter referred to as "preceding") have been ACKed by all of the corresponding consumers. In the examples illustrated in FIG. 5, the last message for which an ACK was received from first consumer 120a was message with ACK ID 13. However, if the first consumer 120a subsequently ACKs the message with ACK ID 14, the first logical ACKlevel pointer 414 maintained by logical queue 208a will be advanced to the next available message (i.e., message with ACK ID 14) in the primary physical queue 206a. The messages with ACK IDs 12, 13 and 14 that are maintained by logical queue 208a are then considered ACKed. Moreover, all messages between first logical ACKlevel pointer 414 and first logical nextRead pointer 416 are considered to correspond to messages that are in flight to the corresponding consumer.

As messages are dispatched to and ACKed by interested consumers, e.g., 120a-120n, ACKed messages may be deleted from the primary physical queue 206a. As shown in FIG. 5, for example, the messages that are to be deleted (e.g., messages with ACK IDs 12 and 13) are those preceding a physical ACKlevel pointer 402 to the primary physical queue 206a. The physical ACKlevel pointer specifies the highest ACKed message in the primary physical queue 206a for which all preceding messages have been ACKed. As will be described in more detail below in connection with FIG. 6, the physical ACKlevel pointer 402 is advanced based on the relative position of corresponding logical ACKlevel pointers maintained by each logical queue 208a-208n, where first logical queue 208a and $n^{th}$ logical queue 208n correspond to consumers 120a and 120n, respectively. More specifically, the physical ACKlevel pointer 402 may be set for the primary physical queue 206a to the minimum logical ACKlevel pointer maintained by all of the logical queues and then all messages preceding the physical ACKlevel pointer 402 may be deleted from the physical queue 206a.

In the example illustrated in FIG. 5, the $n^{th}$ logical ACKlevel pointer 418 maintained by $n^{th}$ logical queue 208n specifies a different message, e.g., a message with a larger ACK ID, than the first logical ACKlevel pointer 414 (i.e., message with ACK ID 14 rather than message with ACK ID 13). In this instance, the corresponding $n^{th}$ consumer 120n has processed more messages that first consumer 120a and thus, has ACKed message with ACK ID 14 as well as message with ACK ID 13. More specifically, first logical ACKlevel pointer 414 maintained by first logical queue 208a specifies a message with an ACK ID (i.e., 13) that is less than the ACK ID for the message specified by the $n^{th}$ logical ACKlevel pointer 418 (i.e., 14). Therefore, the physical ACKlevel pointer 402 identifies the message corresponding to the ACK ID specified by the first logical ACKlevel pointer 414 (i.e., message with ACK ID 13) because it is the minimum logical ACKlevel pointer of all of the logical ACKlevel pointers among the logical queues.

However, once message 14 is ACKed by first consumer 120a and the first logical ACKlevel pointer 414 is advanced accordingly, the physical ACKlevel pointer 402 is advanced to specify the next non-acknowledged message in the primary physical queue 206a (i.e., message with ACK ID 15). All of the messages preceding the physical ACKlevel pointer 402 (i.e., messages with ACK IDs 12, 13 and 14) may then be deleted from the primary physical queue 206a.

Figure 6:
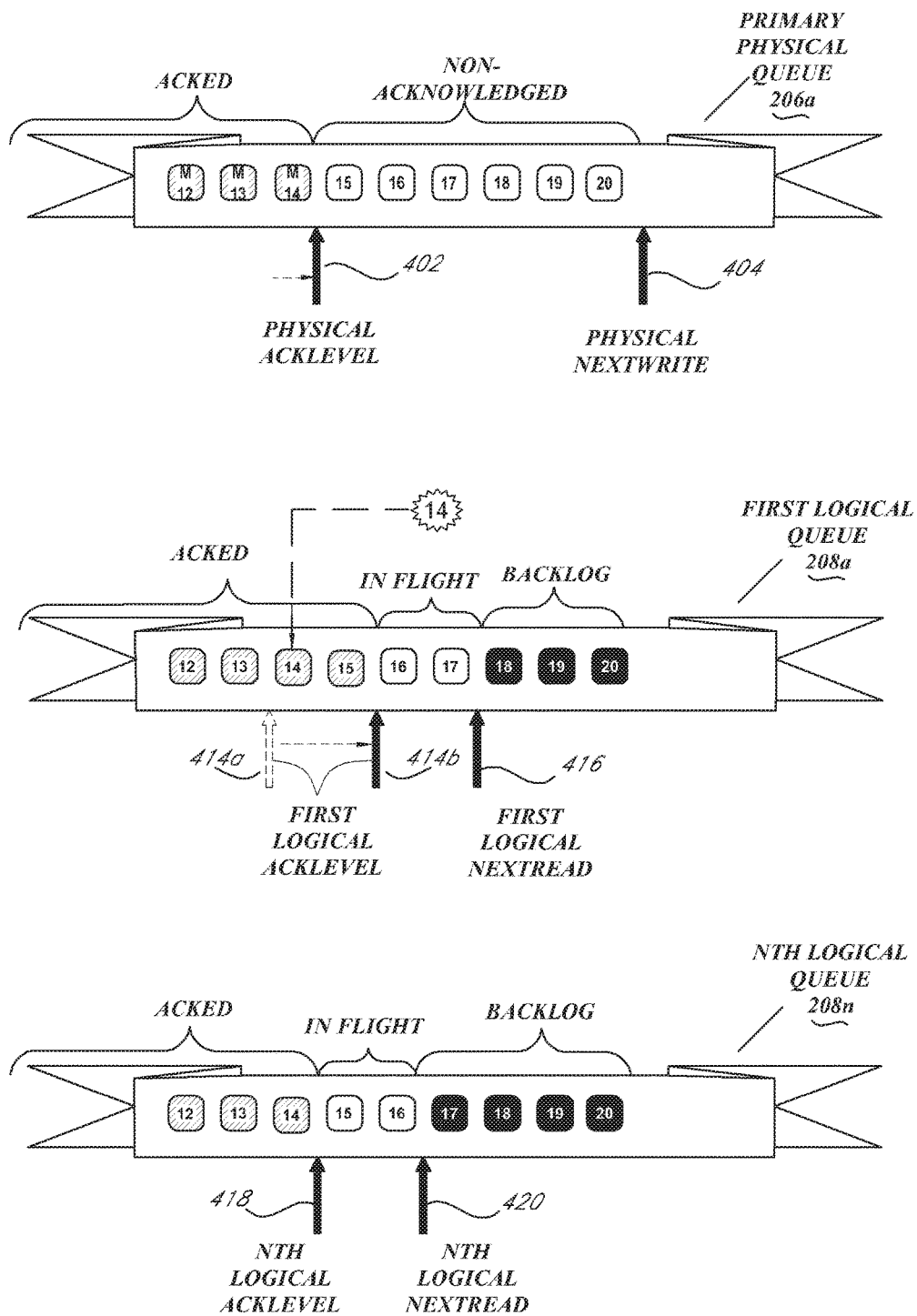

Those skilled in the art will appreciate that messages may be received and/or processed by a consumer out of order. Consequently, messages may be ACKed out of order. FIG. 6 illustrates the operation of the logical and physical pointers in such circumstances. Referring to FIG. 6, first consumer 120a has ACKed the message with ACK ID 15 prior to ACKing the message with ACK ID 14. Consequently, the message with ACK ID 14 remains in flight and the first logical ACKlevel pointer 414a maintained by logical queue 208a cannot advance. Accordingly, only the messages with ACK IDs 12 and 13 as indicated by the first logical ACKlevel pointer 414a are considered ACKed until the ACK for message with ACK ID 14 arrives.

The first logical ACKlevel pointer 414a associated with the first logical queue 208a will not advance (and thus, the physical ACKlevel pointer 402 associated with the primary physical queue 206a will not advance) until the out of order messages (e.g., the message with ACK ID 14 in the illustrated example) are ACKed. Once the out of order message with ACK ID 14 is ACKed by the first consumer 120a, the first logical ACKlevel pointer 414a is advanced to the next available message (i.e., message with ACK ID 16) in the primary physical queue 206a as indicated in the FIG. 6 by first logical ACKlevel pointer 414b. As a result, the minimum logical ACKlevel pointer maintained by all of the logical queues is now the $n^{th}$ logical ACKlevel pointer 418 associated with the $n^{th}$ logical queue, which pointer indicates that messages with ACK IDs 12, 13 and 14 have been ACKed. The physical ACKlevel pointer 402 is therefore advanced to specify the next non-acknowledged message in the primary physical queue (i.e., message with ACK ID 15). All of the messages preceding the physical ACKlevel pointer 402 (i.e., messages with ACK IDs 12, 13 and 14) may then be deleted from the primary physical queue 206a.

As described above, as messages are ACKed by consumers and deleted from the primary physical queue 206a, the primary broker 110a will inform the backup brokers 110b and 110c regarding which messages have been ACKed. In one embodiment, the primary broker 110a does so by communicating the position of its physical ACKlevel pointer 402 to its backup brokers, e.g., secondary backup broker 110b and tertiary backup broker 110c. In turn, the backup brokers update their respective physical ACKlevel pointers to their respective backup physical queues to the same position indicated by the primary broker's physical ACKlevel pointer. All of the messages preceding the updated physical ACKlevel pointers are then deleted from the backup queues.

Figure 7:
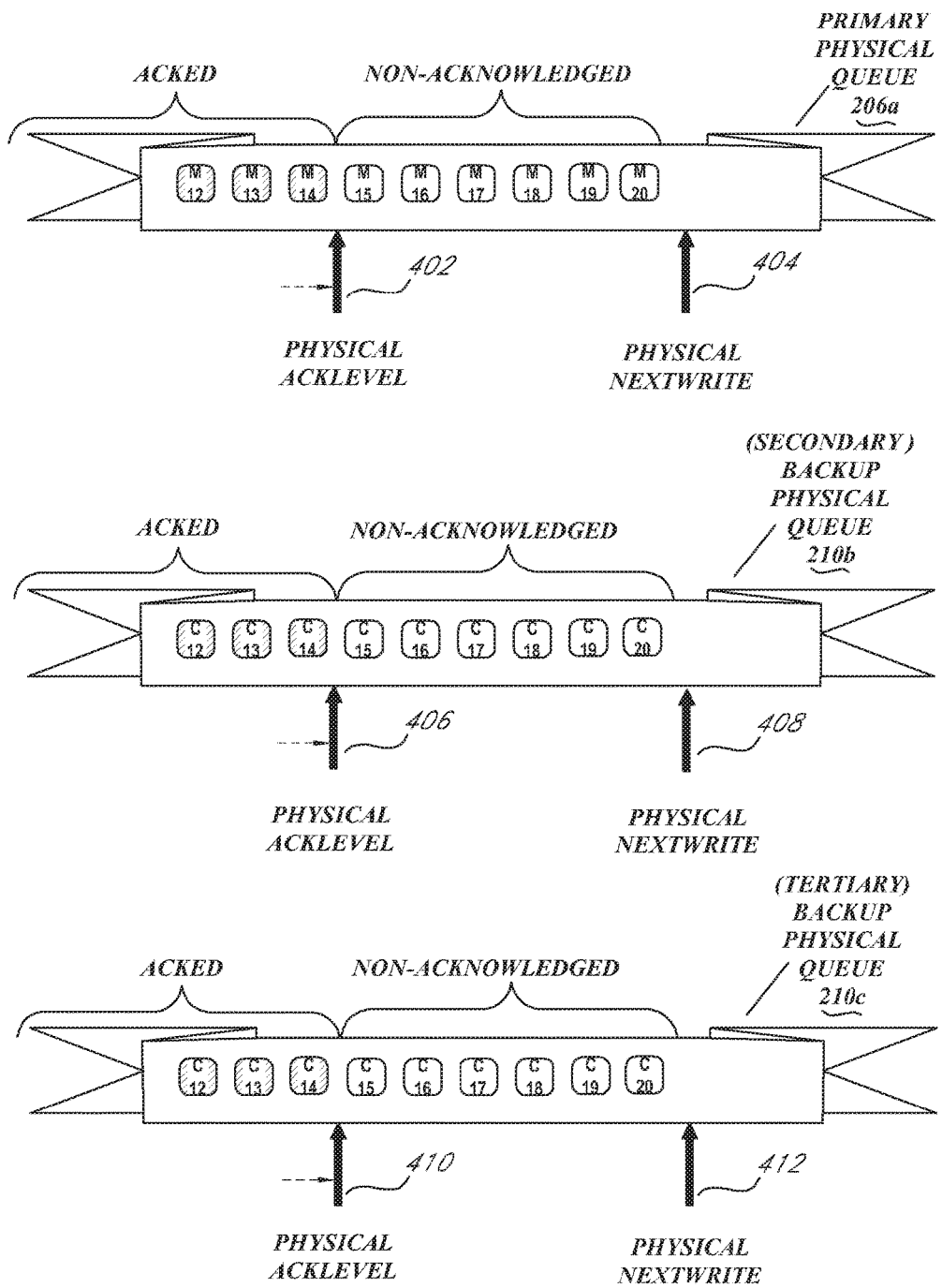

For example, as shown in FIG. 7, when the physical ACKlevel pointer 402 of the primary physical queue 206a is advanced to specify the next non-acknowledged message in the primary physical queue (i.e., message with ACK ID 15), the primary broker 110a may communicate the position of physical ACKlevel pointer 402 to the secondary broker 110b and the tertiary broker 110c. Secondary broker 110b then advances its physical ACKlevel pointer 406 to the same position, i.e., to the message copy with ACK ID 15. Similarly, tertiary broker 110c advances its physical ACKlevel pointer 410 to the message copy with ACK ID 15 as well. All of the message copies preceding the physical ACKlevel pointer 406 and physical ACKlevel pointer 410 (i.e., messages with ACK IDs 12, 13 and 14) may then be deleted from secondary backup physical queue 210a and tertiary backup physical queue 210c, respectively.

Figure 8:
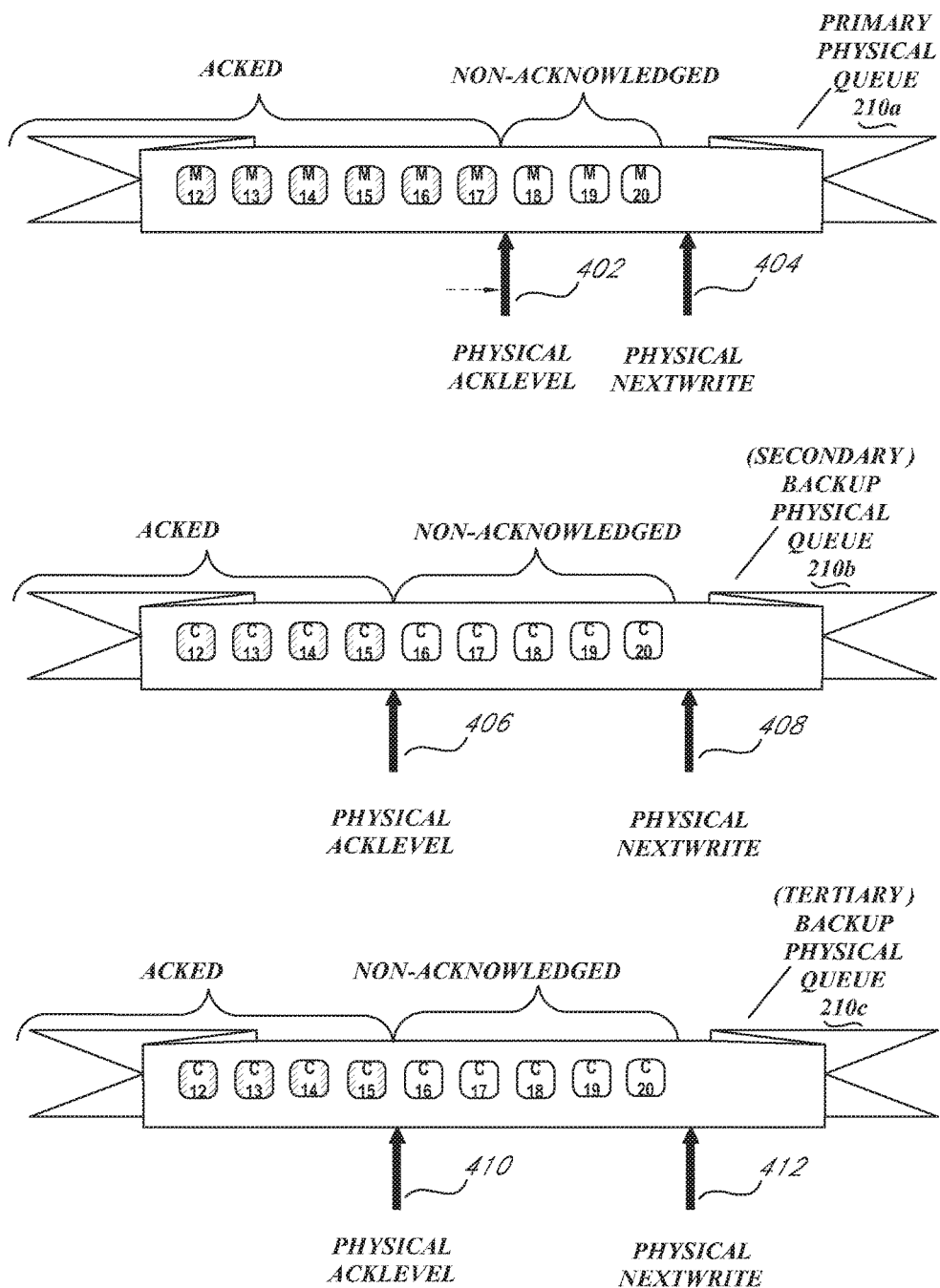

Primary broker 110a may communicate the position of its ACKlevel pointer 402 to its backup brokers directly, via broadcast, via gossip or via any other communication protocol without departing from the scope of the present disclosure. Moreover, the primary broker 110a may communicate the position of its ACKlevel pointer 402 to its backup brokers immediately upon update of its physical ACKlevel pointer 402, or lazily, e.g., subsequent to update of its physical ACKlevel pointer 402 on a periodic or aperiodic basis. An example of the result of such lazy communication is shown in FIG. 8, where the physical ACKlevel pointer 402 of the primary physical queue 206a has been advanced to reflect that the messages with ACK IDs 12-17 have been acknowledged. However, in the illustrated example, the primary broker 110a last communicated the position of its physical ACKlevel pointer 402 to the backup brokers 110b and 110c when it indicated that the messages with ACK ID 16 was the next non-acknowledged message. Accordingly, the physical ACKlevel pointers 406 and 410 of the secondary backup queue 210b and tertiary backup queue 210c, respectively, have only been advanced to the message copy with ACK ID 16.

Should the primary broker 110a fail at this point, secondary broker 110b would begin dispatching messages from its secondary backup queue 210b beginning with the next available message copy, i.e., message copy with ACK ID 16 (and if the secondary broker 110b fails, the tertiary broker 110c shall begin sending the messages). This may result in the duplicate dispatch of the messages with ACK IDs 16 and 17, because these messages were already dispatched by and acknowledged to the primary broker 110a. Those skilled in the art will appreciate that due to the possibility of duplicate messages caused by the lazy communication of message acknowledgments to backup brokers, the primary broker can assure the originating producer that at least one copy of the message will be dispatched, but will not assure that only one copy of the message will be dispatched. It will also be appreciated that there is a tradeoff between how often the primary broker communicates the position of its physical ACKlevel pointer to the backup brokers and the number of duplicated messages interested consumers will tolerate. Accordingly, the frequency at which the position of the physical ACKlevel pointer is communicated to the backup brokers and/or the time between such communications may vary (e.g., by cluster) and may be modified automatically or manually (e.g., by a system administrator) depending on one or more factors such as performance, message volume, rate of broker failure, etc.

Figure 9:
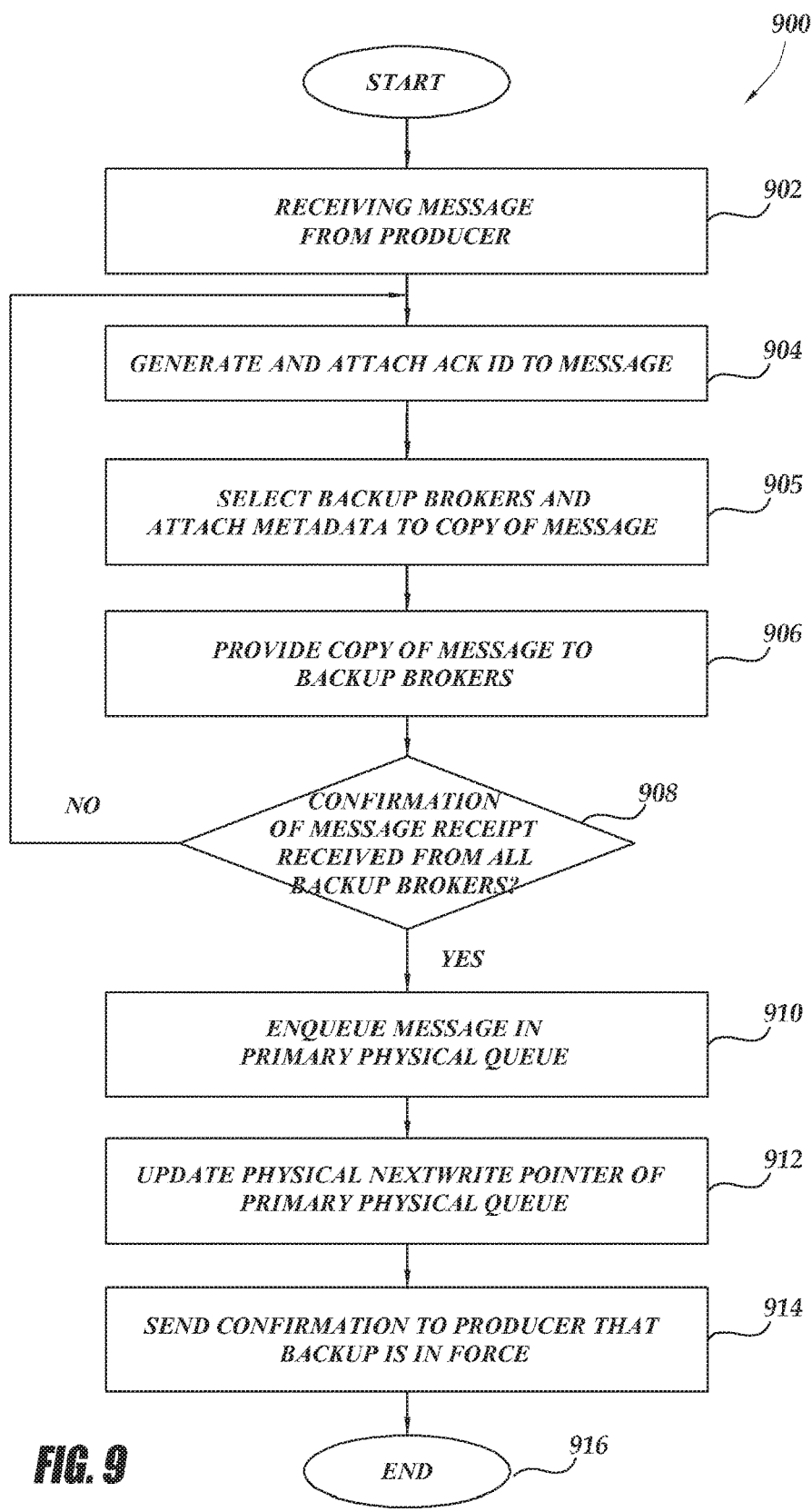
FIG. 9 is a flow diagram of an illustrative method for updating a primary physical queue maintained by the primary broker as messages are enqueued by producers.

Now that the overall operation of the primary and backup brokers has been described, the management of the queues maintained by the primary and backup brokers will be described in more detail. FIG. 9 is a flow diagram of an illustrative method 900 performed by the primary broker 110a for updating a primary physical queue maintained by the primary broker as messages are enqueued by producers. In block 902, the primary broker 110a receives a message from a producer. The broker then generates and attaches an ACK ID to the message in block 904. As noted above, in one embodiment, incoming messages are assigned ACK IDs in monotonically increasing order as messages are received. Next in block 905, the primary broker 110 selects backup brokers for the message copy and assigns metadata to the message copy identifying the backup brokers it has selected. As noted above, backup brokers may be selected message-by-message based on a configuration policy or randomly. In yet other embodiments, the backup brokers are pre-designated. For example, the backup brokers may be the same for every message or for those messages from the same producer. In block 906, the primary broker 110a provides a copy of the message (including the metadata) to the backup brokers of its choice, e.g., secondary broker 110b and tertiary broker 110c in the illustrated examples.

In one embodiment, the primary broker uses the same backup brokers for each message. In another embodiment, the primary broker selects the backup brokers on a message-by-message basis. In some embodiments, the primary broker may select backup brokers located at different data centers in order to decrease the risk of failure should an entire data center be compromised. However, selecting a backup broker at a different data center may increase the cost of transmission. Accordingly, in some embodiments, the primary broker selects the backup brokers based upon a configuration policy that considers one or more of the following: locality of the brokers, load balancing of the brokers, transmission costs, operational/functional limits of the brokers, etc. In yet other embodiments, the primary broker may randomly select the backup brokers.

After providing message copies to the backup brokers, the primary broker 110a waits for confirmation of message receipt from each of the backup brokers to whom it sent a copy before enqueuing the message to its own primary physical queue 206a. Accordingly, in decision block 908, the primary broker 110a determines if confirmation of message receipt has been received from all of its backup brokers. In the illustrated embodiment, if confirmation is not received, the primary broker 110 retries backing up the message. In this regard, blocks 904 through 908 of FIG. 4 are repeated. Alternatively, the primary broker 110a returns the message to the originating producer. Those skilled in the art will appreciate that the primary broker may determine that confirmation has not been received based upon a time-out condition being met or based upon an explicit indication of transmission failure, e.g., a message that a network communication connection with a backup broker has failed. However, those skilled in the art will also appreciate that in some of these cases, a backup broker may have still successfully enqueued a copy of the message in its backup physical queue. Accordingly, if the primary broker fails, a copy of the message may still be delivered by the backup broker, resulting in a duplicate, yet fault tolerant, delivery. However, in such cases the primary broker may not have provided the producer with assurance of message delivery since confirmation of message copy receipt was not received from all of its backup brokers.

Returning to decision block 908, if the primary broker 110a receives confirmation of message copy receipt from all backup brokers, the primary broker 110a enqueues the message with ACK ID and associated metadata in primary physical queue 206a for later dispatch in block 910. After enqueuing the message in the primary physical queue 206a, the primary broker 110a updates the physical nextWrite pointer 404 of the primary physical queue in block 912. More specifically, the primary broker 110a advances its physical nextWrite pointer 404 to the next available position at the end of the primary physical queue 206a. In block 914, the primary broker 110a sends a confirmation to the originating producer that backup of the message is in force and that at least one copy of the message will be delivered. The method then ends in block 916.

Figure 10:
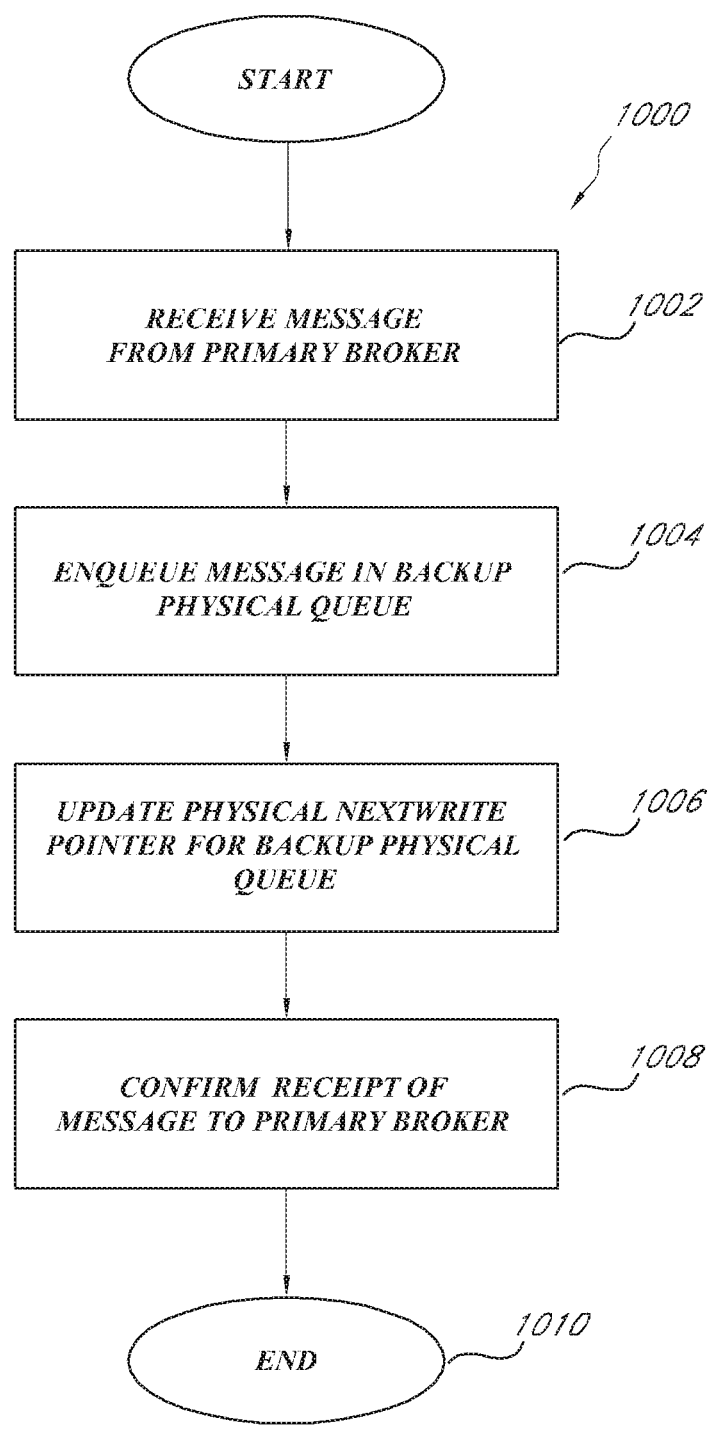
FIG. 10 is a flow diagram of an illustrative method for updating a backup physical queue maintained by a backup broker as copies of messages are received from the primary broker.

FIG. 10 is a flow diagram of an illustrative method 1000 performed by each backup broker (e.g., backup broker 110b and backup broker 110c) for updating backup physical queue maintained by each backup broker as copies of messages are received from the primary broker. In block 1002, the backup broker (e.g., backup broker 110b) receives a message copy from the primary broker 110a. In block 1004, the backup broker 110b enqueues the message copy in its backup physical queue 210b for the primary broker 110a for later dispatch should the primary broker 110a fail. After enqueuing the message copy in the backup physical queue 210b, the backup broker 110b updates the physical next-Write pointer 408 of the backup physical queue 210a in block 1006. More specifically, the backup broker 110b advances the nextWrite pointer 408 to the next available position at the end of the backup physical queue 210b. Next, in block 1008, the backup broker 110b sends the primary broker 110a confirmation of receipt for the message copy. The method then ends in a block 1010. Those skilled in the art will appreciate that any other backup brokers (e.g., backup broker 110c) similarly perform method 1000. Accordingly, each backup broker enqueues a copy of the message provided by the primary broker 110a and provides the primary broker 110a with confirmation of receipt of the message copy. As noted above, when the primary broker 110a receives confirmation of message copy receipt from all of the backup brokers, the primary broker 110a sends the originating producer confirmation of message backup.

Figure 11:
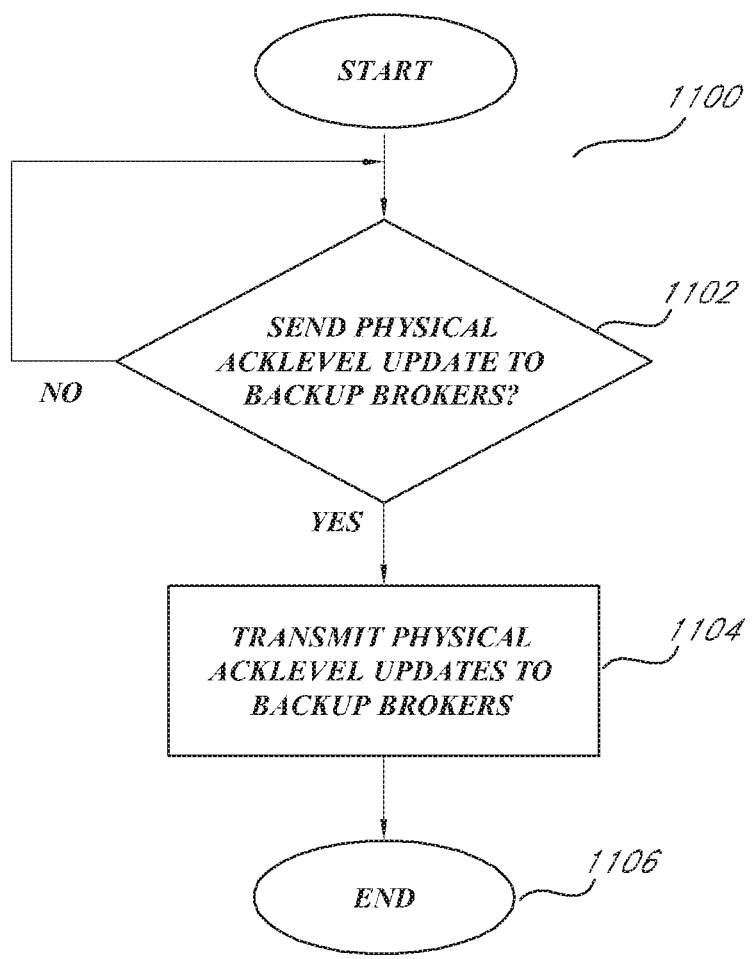
FIG. 11 is a flow diagram of an illustrative method for notifying the backup brokers of updates to the primary physical queue as messages are acknowledged by consumers to the primary broker.

FIG. 11 is a flow diagram of an illustrative method 1100 performed by the primary broker 110a for notifying the backup brokers (e.g., backup brokers 110b and 110c) of updates to the primary physical queue 206a as messages are acknowledged by consumers to the primary broker. In decision block 1102, the primary broker 110a determines whether to send the position of this physical ACKlevel pointer 402 to the backup brokers 110b and 110c. As discussed above, the primary broker 110a may communicate the position of its physical ACKlevel pointer 402 to its backup brokers directly, via broadcast or via gossip without departing from the scope of the present disclosure. Moreover, the primary broker 110a may communicate the position of its physical ACKlevel pointer 402 to any backup brokers immediately upon update of its physical ACKlevel pointer 402, or lazily, e.g., on a periodic or aperiodic basis.

If the primary broker 110a determines to send the update in decision block 1102, the primary broker 110a transmits the position of its physical ACKlevel pointer 402 to the backup brokers (e.g., backup brokers 110b and 110c) in block 1104. Otherwise, the primary broker 110a defers doing so until such point as it deems appropriate. The method 1100 then ends in a block 1106.

Figure 12:
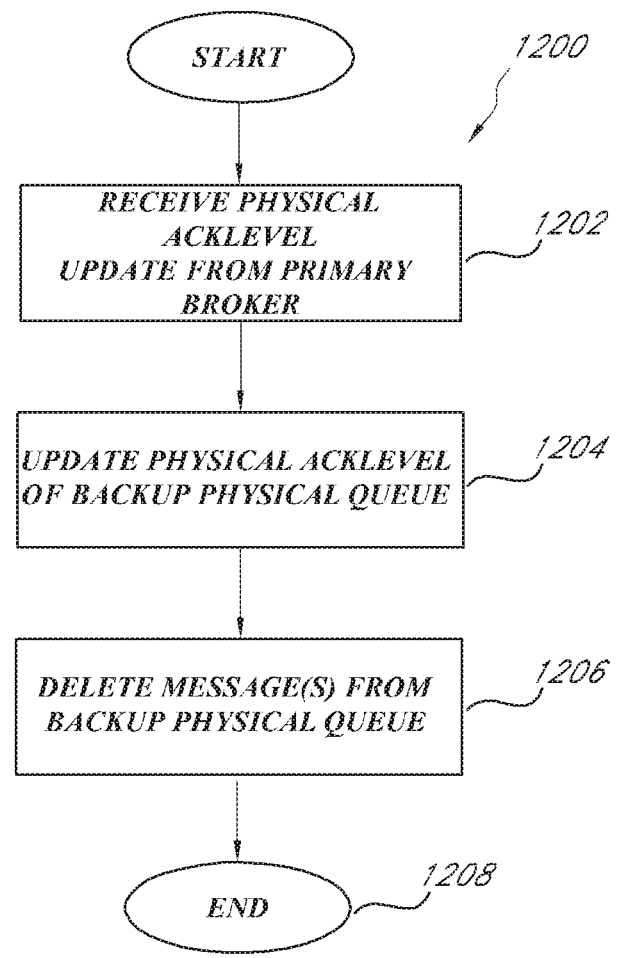
FIG. 12 is a flow diagram of an illustrative method for updating the backup physical queues of the backup brokers in accordance with the received notifications.

FIG. 12 is a flow diagram of an illustrative method 1200 performed by each of the backup brokers (e.g., backup brokers 110b and 110c) for updating their respective backup physical queues (e.g., backup physical queues 210b and 210c) in accordance with the position of the physical ACKlevel pointer of the primary broker 210b. In block 1202, the backup broker (e.g., backup broker 110b) receives the physical ACKlevel update (i.e., the position of the primary broker's physical ACKlevel pointer 402) from the primary broker 110a. Accordingly, the backup broker 110 updates the physical ACKlevel pointer 406 of the backup physical queue 210a in block 1204. More specifically, the backup broker 110b advances its physical ACKlevel pointer 406 to the same position as the primary broker's physical ACKlevel pointer 402. Next, in block 1206, the backup broker 110b deletes all message copies preceding the updated physical ACKlevel pointer 406 from the backup broker's physical backup queue 210b. In some embodiments, the messages are deleted upon update of the backup broker's physical ACKlevel pointer. In yet other embodiments, the messages are deleted lazily, e.g., subsequent to the update on a periodic or aperiodic basis. The method then ends in a block 1208.

Those skilled in the art will appreciate that any other backup brokers (e.g., backup broker 110c) similarly perform method 1200. Accordingly, each backup broker updates the physical ACKlevel pointer for its backup queue for the primary broker 110a and deletes any messages preceding the physical ACKlevel pointer from the backup queue. Accordingly, if the primary broker (and any intervening backup brokers) fails, the backup broker will be able to activate its backup physical queue beginning with the next message copy.

Figure 13:
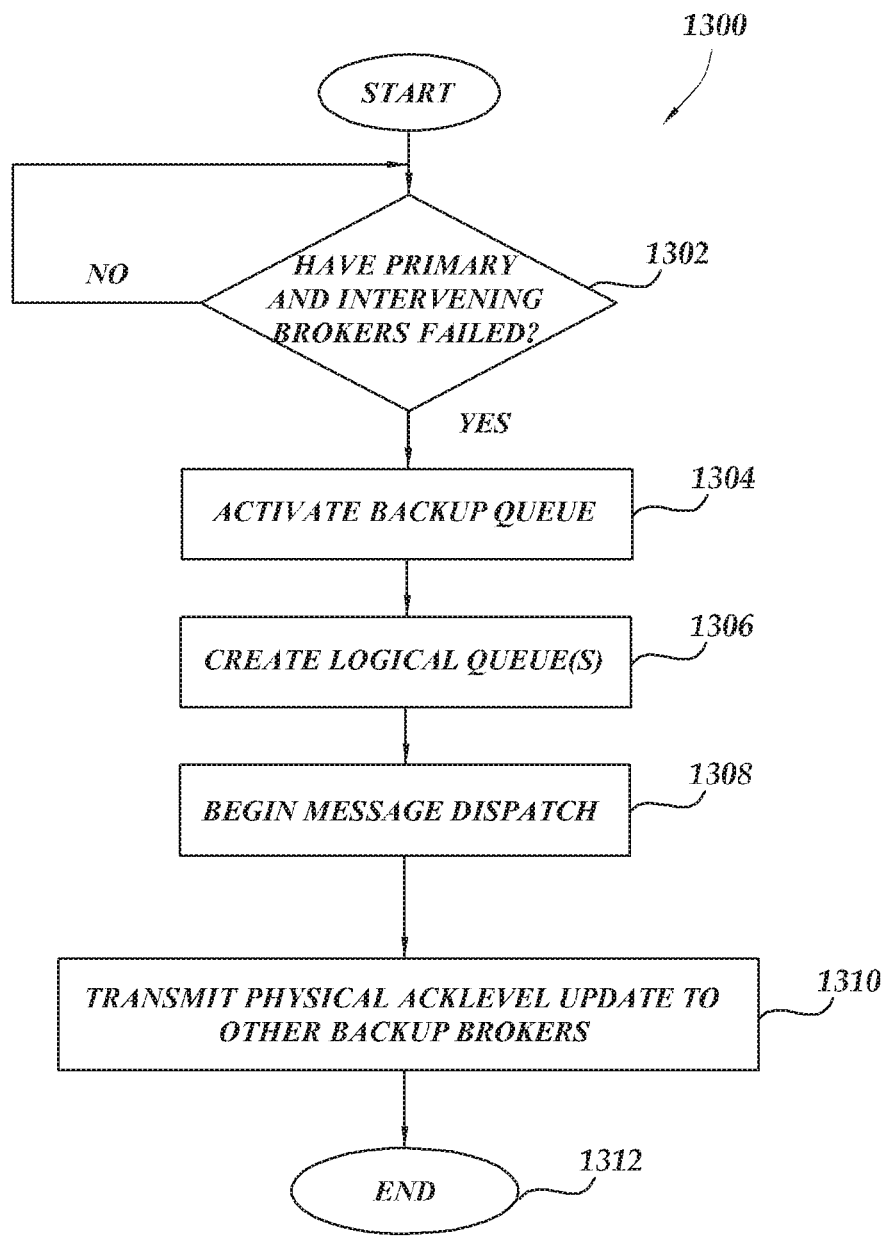
FIG. 13 is a flow diagram of an illustrative method for processing messages when a backup broker determines that a primary broker and any intervening brokers have failed.

FIG. 13 is a flow diagram of an illustrative method 1300 performed by a backup broker for processing messages when a backup broker determines or detects that a primary broker (and any intervening brokers) has failed. For example, method 1300 may be performed by backup broker 110b if it determines that primary broker 110a has failed. However, if backup broker 110b has also failed, backup broker 110c may perform the method 1300. In this case, backup broker 110b may be referred to as an "intervening broker." However, up to n brokers may be selected as backup brokers for the primary broker. Accordingly, the backup brokers up to the n-1 broker may be referred to as the "intervening brokers." Moreover, those skilled in the art will appreciate from the present disclosure that given n brokers, failure of n-1 brokers can be overcome so that each message may still be dispatched.

In block 1302, the backup broker 110b determines or detects that the primary broker (and any intervening brokers) have failed. In some embodiments, declaring that a broker has failed or is "dead," is an event that is propagated or communicated to all of the brokers in a cluster, e.g., cluster 122. A broker may be declared dead manually, e.g., by a system administrator, or automatically, e.g., via timeout rules. If declared automatically, e.g., via timeout rules, the rules may be applied by a managing service for the cluster or by each broker individually. Accordingly, in some embodiments, there may not be consensus among all of the brokers in a cluster that a particular broker has failed. In such cases, a backup broker may activate its backup physical queue prematurely, and thus, duplicate messages may be delivered. However, such duplicates may be tolerated to ensure dispatch of messages.

If the backup broker detects that the primary broker (and any intervening brokers) have failed in block 1302, the backup broker activates its backup physical queue in block 1304. Otherwise, the backup broker continues to back up incoming message copies as described above.

Following activation, the backup broker creates one or more logical queues, e.g., one for each consumer, in block 1306 to track the status of the messages stored in the backup physical queue. Accordingly, the backup broker (e.g., backup broker 110b) begins dispatching messages from its activated backup physical queue in block 1308 beginning with, e.g., the next message following the physical ACKlevel pointer for its backup queue (e.g., physical ACKlevel pointer 406).

As discussed above in connection with the primary physical queue, the position of the physical ACKlevel pointer for the backup physical queue may be maintained following activation using the logical queues created in block 1306. Accordingly, in some embodiments, the primary broker may transmit the positions of the logical ACKlevel pointers for its logical queues to the backup broker, rather than the position of its physical ACKlevel pointer. Accordingly, when the backup broker activates its physical backup queue in the event of failure, messages are dispatched to consumers according to the positions of the logical ACKlevel pointers to the backup broker's logical queues, which logical ACKlevel pointers have been updated to the positions of the logical ACKlevel pointers of the primary broker. Since the position of the physical ACKlevel pointer of the backup queue may be much lower than that of the updated logical ACKlevel pointers, dispatch based on the position of the updated logical ACKlevel pointers may reduce the number of duplicate messages delivered by the system 100.

In block 1310, the backup broker (who has now activated its backup physical queue) transmits the position of its physical ACKlevel pointer (or in some embodiments, the positions of its logical ACKlevel pointers) to any other backup brokers (e.g., backup broker 110c). The other backup brokers then update their own physical ACKlevel pointers accordingly. The method 1300 then ends in block 1308.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a first broker implemented by one or more computing devices, the first broker acting as a primary broker for a producer, the first broker configured with computer-executable instructions to:
generate, in a first data store, a primary queue for the producer, the primary queue designated to store a message received from the producer and intended for delivery to one or more consumers;
receive the message from the producer for delivery to the one or more consumers;
transmit the message to a secondary broker for the producer and a tertiary broker for the producer;
receive confirmation that the message has been enqueued by both the secondary broker for the producer and the tertiary broker for the producer; and
only after receiving confirmation at the first broker that the message has been enqueued by both the secondary broker for the producer and the tertiary broker for the producer, transmit a confirmation to the producer that the message has been received at the system and enqueue the message in the primary queue for the producer;
a second broker implemented by the one or more computing devices, the second broker acting as the secondary broker for the producer, the second broker configured with computer-executable instructions to:
generate, in a second data store, a secondary queue for the producer, the secondary queue designated to act as a backup to the primary queue for the producer;
receive the message from the first broker;
enqueue the message in the secondary queue for the producer; and
transmit confirmation to the first broker that the message has been enqueued at the secondary broker; and
a third broker implemented by the one or more computing devices, the third broker acting as the tertiary broker for the producer, the third broker configured with computer-executable instructions to:
generate, in a third data store, a tertiary queue for the producer, the tertiary queue designated to act as a backup to the primary queue for the producer;
receive the message from the first broker;
enqueue the message in the tertiary queue for the producer; and
transmit confirmation to the first broker that the message has been enqueued at the tertiary broker.

2. The system of claim 1, wherein the third broker further acts as a primary broker for a second producer, and wherein the third broker is further configured with computer-executable instructions to:
generate, in the third data store, a primary queue for the second producer;
receive a second message from the second producer for delivery to one or more additional consumers;
transmit the second message to a secondary broker for the second producer and a tertiary broker for the second producer;
receive confirmation that the second message has been enqueued by both the secondary broker for the second producer and the tertiary broker for the second producer; and
after receiving confirmation that the second message has been enqueued by both the secondary broker for the second producer and the tertiary broker for the second producer, transmit a confirmation to the second producer that the second message has been received at the system and enqueue the message in the primary queue for the second producer.

3. The system of claim 1, wherein at least one of the first broker or the second broker acts as at least one of the secondary broker for the second producer or the tertiary broker for the second producer.

4. The system of claim 1, wherein the first broker is further configured with computer-executable instructions to:
generate a pointer to a location of the message in the primary queue for the producer;
receive acknowledgement of the message from each of the one or more consumers; and
update a location of the pointer to a location in the primary queue for the producer for a next message not yet acknowledged by each of the one or more consumers.

5. Non-transitory computer-readable storage media including computer-executable instructions that when implemented by a first broker cause the first broker to:
- generate, in a data store, a primary queue for a producer, the primary queue designated to store a message received from the producer and intended for delivery to a consumer;
- receive the message from the producer for delivery to a consumer;
- transmit the message to a secondary broker for the producer and a tertiary broker for the producer;
- receive confirmation that the message has been enqueued by both the secondary broker for the producer and the tertiary broker for the producer; and
- only after receiving confirmation at the first broker that the message has been enqueued by both the secondary broker for the producer and the tertiary broker for the producer, transmit a confirmation to the producer that the message has been received at the first broker and enqueue the message in the primary queue for the producer.

6. The non-transitory computer-readable storage media of claim 5, the computer-executable instructions further cause the first broker to transmit the message to the consumer.

7. The non-transitory computer-readable storage media of claim 6, the computer-executable instructions further cause the first broker to:
- obtain an acknowledgement of receipt of the message at the consumer; and
- generate an acknowledgement pointer to a location, within the primary queue for the producer, of a next message not yet acknowledged by the consumer.

8. The non-transitory computer-readable storage media of claim 5, wherein the producer is a first producer, and wherein the computer-executable instructions further cause the first broker to:
- generate, in the data store, a backup queue for a second producer, the backup queue designated to act as a backup to a primary queue for the second producer, the primary queue for the second producer generated by a primary broker for the second producer;
- receive a second message from the primary broker for the second producer;
- enqueue the second message in the backup queue for the second producer; and
- transmit confirmation to the primary broker that the second message is enqueue in the backup queue.

9. The non-transitory computer-readable storage media of claim 8, wherein a single broker corresponds to both the primary broker for the second producer and at least one of the secondary broker for the first producer or the tertiary broker for the first producer.

10. The non-transitory computer-readable storage media of claim 8, wherein the second message is designated for delivery to at least one of the consumer or an additional consumer.

11. The non-transitory computer-readable storage media of claim 8, wherein the computer-executable instructions further cause the first broker to:
- detect that the primary broker for the second producer has failed; and
- initiate transmission of any messages stored within the backup queue.

12. The non-transitory computer-readable storage media of claim 8, wherein the computer-executable instructions further cause the first broker to identify the second message as associated with the backup queue for the second producer based at least in part on metadata included within the second message.

13. The non-transitory computer-readable storage media of claim 12, wherein
the metadata identifies the primary broker for the second producer.

14. A computer-implemented method as implemented by a first broker, the computer-implemented method comprising:
- generating, in a data store, a primary queue for a producer, the primary queue designated to store a message received from the producer and intended for delivery to a consumer;
- receiving the message from the producer for delivery to a consumer;
- transmitting the message to a secondary broker for the producer;
- receiving confirmation that the message has been enqueued by the secondary broker for the producer; and
- only after receiving confirmation at the first broker that the message has been enqueued by the secondary broker for the producer, transmitting a confirmation to the producer that the message has been received and enqueuing the message in the primary queue for the producer.

15. The computer-implemented method of claim 14, wherein transmitting the message to a secondary broker for the producer comprises adding metadata to the message identifying the first broker.

16. The computer-implemented method of claim 14, further comprising:
- generating, in the data store, a backup queue for a second producer, the backup queue designated to act as a backup to a primary queue for the second producer, the primary queue for the second producer generated by a primary broker for the second producer;
- receiving a second message from the primary broker for the second producer;
- enqueuing the second message in the backup queue for the second producer; and
- transmitting confirmation to the primary broker that the second message is enqueue in the backup queue.

17. The computer-implemented method of claim 14, wherein the consumer corresponds to a plurality of consumers, and wherein the computer-implemented method further comprises generating a logical queue for each consumer of the plurality of consumers, wherein each logical queue indicates which messages, in the primary queue for the producer, have been acknowledged by the consumer corresponding to the logical queue.

18. The computer-implemented method of claim 17, wherein each logical queue further indicates which messages, in the primary queue for the producer, have been transmitted to a consumer associated with the logical queue.

19. The computer-implemented method of claim 17, wherein each logical queue includes an acknowledgement pointer indicating a location of an earliest message, represented in the logical queue, not yet acknowledged by the consumer corresponding to the logical queue.

20. The computer-implemented method of claim 19 further comprising updating an acknowledgement pointer of a physical queue to a minimum location indicated by the acknowledgement pointers of all logical queues of the plurality of consumers.

* * * * *